Oct. 4, 1949.                L. E. LA BRIE                 2,483,977
           VARIABLE SPEED TRANSMISSION FOR AIRPLANE SUPERCHARGERS
Filed April 9, 1943                                  4 Sheets-Sheet 1

INVENTOR
LUDGER E. LA BRIE
BY
ATTORNEYS

Oct. 4, 1949.　　　　　L. E. LA BRIE　　　　　2,483,977
VARIABLE SPEED TRANSMISSION FOR AIRPLANE SUPERCHARGERS
Filed April 9, 1943　　　　　　　　　　　　　　　4 Sheets-Sheet 2

INVENTOR
LUDGER E. LA BRIE
BY
ATTORNEYS

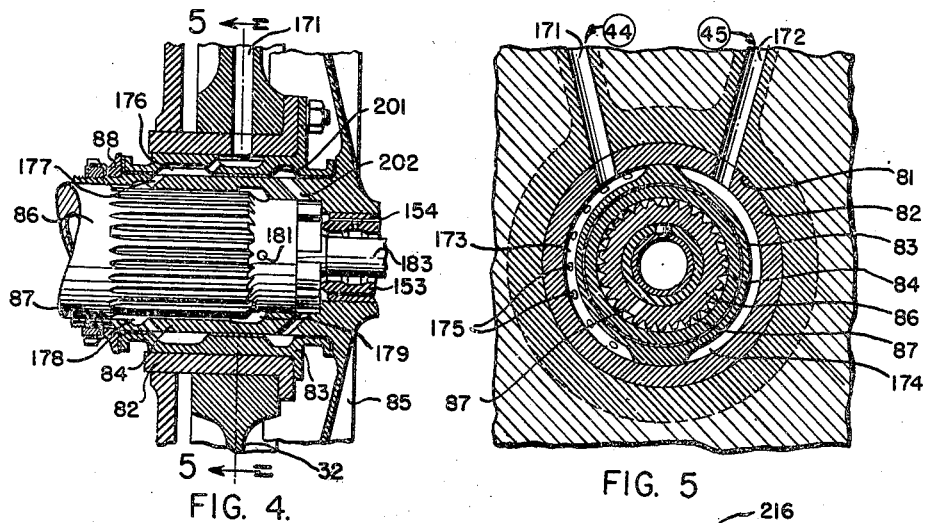
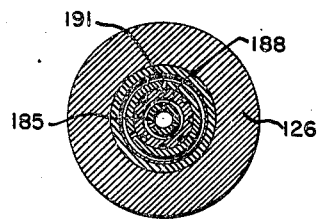
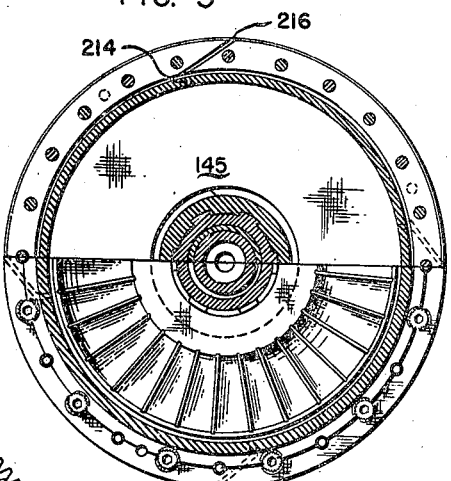
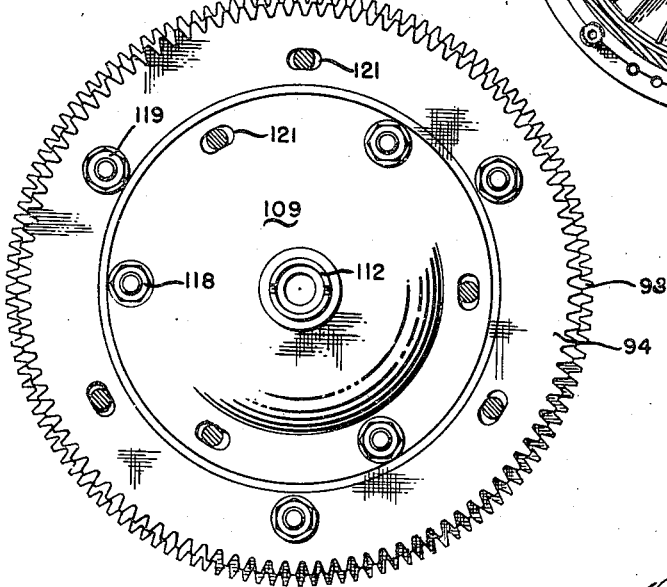

Oct. 4, 1949.  L. E. LA BRIE  2,483,977
VARIABLE SPEED TRANSMISSION FOR AIRPLANE SUPERCHARGERS
Filed April 9, 1943  4 Sheets-Sheet 4

INVENTOR
LUDGER E. LA BRIE
BY
ATTORNEYS

Patented Oct. 4, 1949

2,483,977

UNITED STATES PATENT OFFICE 2,483,977

VARIABLE SPEED TRANSMISSION FOR AIRPLANE SUPERCHARGERS

Ludger E. La Brie, Detroit, Mich., assignor to Chrysler Corporation, Highland Park, Mich., a corporation of Delaware Application April 9, 1943, Serial No. 482,362

16 Claims. (Cl. 74—720)

This invention relates to a variable speed transmission for airplane superchargers and it has particular reference to the provision of mechanism for driving a supercharger or other device at various speed ratios with respect to the prime mover.

Air compressors or superchargers are customarily provided for conjoint operation with the internal combustion engines of airplanes, thereby to increase the horsepower output of the engine with a relatively low increase in the weight of the total power plant. However, due to the inherent characteristics of the supercharger, and to the widely varying conditions under which the engine operates, it is not possible to operate the supercharger at one stated speed, or speed ratio with respect to the engine, which effectively satisfies all the demands of service. Accordingly, it has been proposed to devise a variable speed transmission for such superchargers, gearing them to the engine in such fashion that the supercharger may be operated at one speed during one set of service conditions, and at some other speed ratio when the conditions are altered.

One of the factors affecting the conditions under which the speed ratio should be changed is the density of the air passing through the supercharger for delivery to the engine. For example, if the supercharger is initially designed to deliver a suitable amount of air at a relatively high altitude, it is prone to deliver too much air at sea level. This is due to the circumstance that the density of air varies inversely with the altitude, and therefore the mass of air delivered at any given rotor speed will decrease as the plane ascends. Other conditions are encountered when the pilot should have complete freedom in selecting the speed ratio for the supercharger, and therefore a satisfactory transmission should be subject to adjustable and automatic control.

The present invention looks forward to the provision of a transmission particularly adapted for the service just described, but also obviously adapted to other transmission problems wherein changes in the speed ratio are desirable. Among the objects of the invention are the provision of mechanism which is quite compact and is also relatively light so that it will add the least possible weight to the aircraft and will occupy a minimum of space.

Another object is to devise a satisfactory transmission which can be assembled as a substantially complete unit so that it can be readily replaced in the field and with the limited amount of equipment so frequently available at a military base.

Another aspect of this same general object is to devise the transmission into a number of sub-assemblies thereby expediting production manufacture for military or civil purposes, and moreover facilitating repairs to such parts of the unitary assembly as may become damaged.

Another object of the invention is to provide in such a transmission, means for driving the supercharger at one or the other of two predetermined speed ratios, it being unnecessary for present military duty to extend the ratios beyond this number.

In general, these and numerous other objects are attained through the provision of a housing in which is mounted gearing adapted to drive the impeller members of a hydraulic coupling, which coupling in turn is connected to the driven shaft, that is to say, in this instance, the rotor shaft of the supercharger. Means are provided to admit the hydraulic fluid to the coupling assembly in such fashion that it is directed to one driving member but not to the other, and therefore, the driving members of the coupling, connected at different speed ratios through the gearing, impart to the driven shaft different speeds. Provision is also made whereby the pilot may select the coupling member through which the drive is taken and additional provision may be made for determining this condition in response to the existing barometric pressure.

A typical and preferred embodiment of the invention is illustrated in the accompanying drawings wherein:

Fig. 4 is a detail view taken on the line 4—4 of Fig. 3 and illustrating the connection of the main drive shaft to the initial elements of the gear train.

Fig. 5 is a fragmentary section taken substantially along the line 5—5 of Fig. 4 to illustrate the admission lines for the hydraulic coupling fluid.

Fig. 6 is a section on the line 6—6 of Fig. 3.

Fig. 7 is a section along the line 7—7 of Fig. 3 illustrating the hydraulic coupling construction in greater detail and further showing ports for the removal of coupling fluid.

Fig. 8 is a view taken on the line 8—8 of Fig. 3 to illustrate the assembly and indexing of some of the transmission gears.

Figure 1:
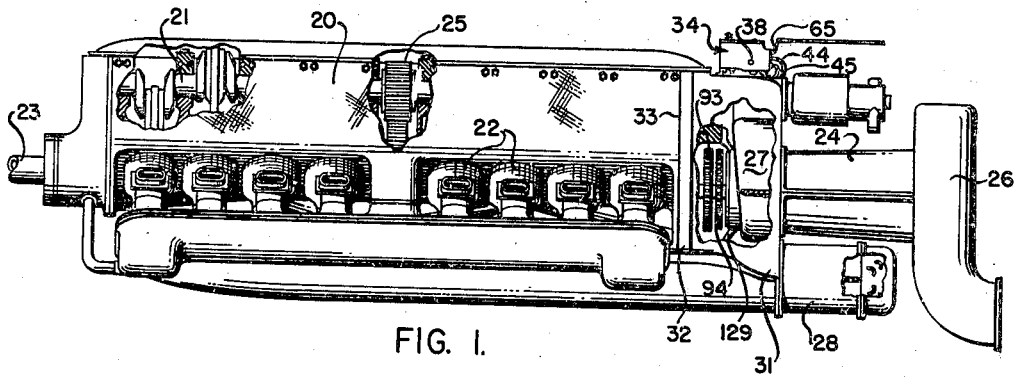
Fig. 1 is a side elevation, with parts broken away, of an airplane engine having a supercharger disposed adjacent thereto and driven by the hereinafter described transmission.

The power plant shown in Fig. 1 comprises an engine 20 having an overhead crankshaft 21 which is revolved by the power developed in the various cylinders 22 to drive a propeller shaft 23 and a supercharger 24. In this particular illustration the supercharger drive is taken from the crankshaft 21 through gearing 25 and a countershaft which, for the purposes of this description may hereafter be considered as a main driving shaft. The supercharger 24 is shown as being of the axial flow type wherein air is inducted through an inlet 26 delivery to a scroll 27 and thence into an engine inlet manifold 28. It will, of course, be understood, except as hereinafter noted, that the engine and supercharger elements form no part of the present invention but have simply been referred to in order to point out more fully one of the uses to which the invention may be put.

It will also be seen in Fig. 1 that the engine 20 and supercharger 24 are spaced by a casing member including a housing member 31 and an end plate 32 abutting the rear end 33 of the engine block. The scroll 27 is moreover within the confines of the housing 31. So much of the apparatus constitutes parts of the transmission mechanism shown in the remaining figures and hereinafter described in detail. The housing 31 moreover has mounted upon it a control unit 34 shown in greater detail in Fig. 2.

Figure 2:
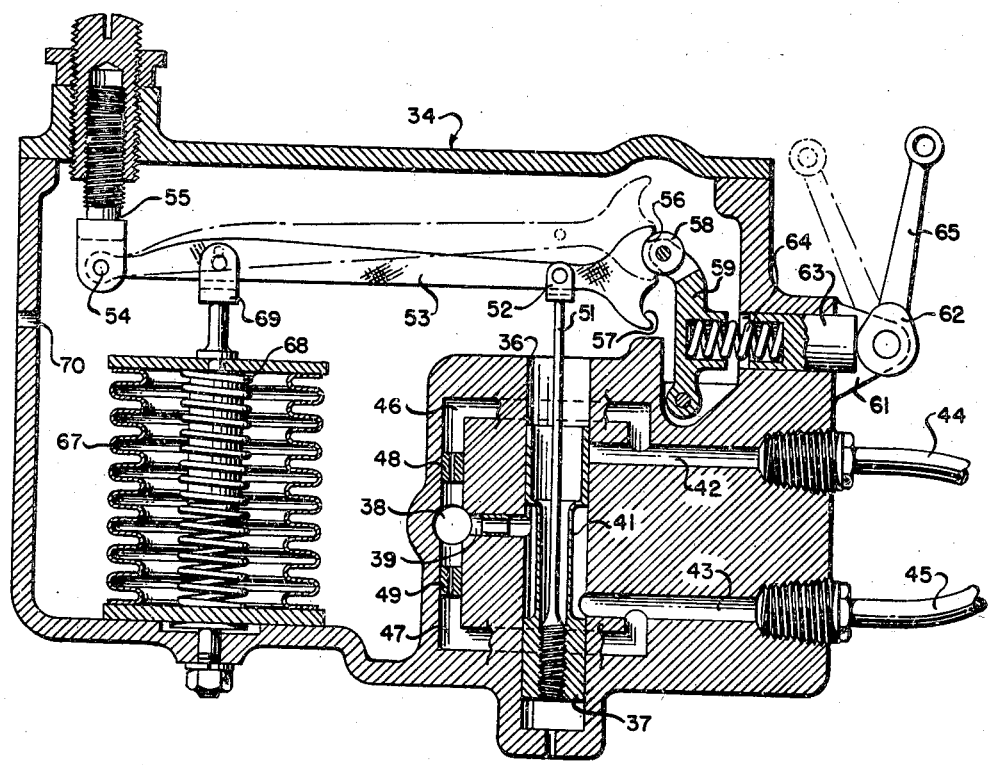
Fig. 2 is a sectional view of a control apparatus which may be employed for selecting the speed ratio either manually, or automatically, or by a combination of both.

Referring to Fig. 2, the unit 34 comprises a substantially rectilinear housing formed with a duct 36 in which is mounted a valve member 37. An angularly disposed duct 38 communicates with the duct 36 through a lateral 39, to provide a means for admission of hydraulic fluid under pressure from an extraneous source, such, for example, as the engine crankcase. The duct 39 communicates with a reduced portion 41 formed between the ends of the valve member 37 and, depending upon the position of the valve, with one or the other of two outlet ducts 42 or 43. These ducts in turn are connected to the transmission by tubing 44 and 45.

It will be noted that the inlet duct 38 is also in communication with the ducts 42 and 43 through branch passages 46 and 47 respectively, which by-pass the duct 36 and the valve member 37, but are choked by plugs 48 and 49 formed with comparatively small apertures. As this description proceeds, it will be pointed out more fully that working fluid is supplied to the transmission through either of the conduits 44 or 45 in order to effect the desired speed ratio. However, it is desirable for lubrication and cooling purposes to have some fluid flow through the other of the lines 45 or 44, and for this reason the by-passes 46 and 47 have been provided. The restricting plugs 48 and 49 permit a very small flow of fluid into the then inoperative part of the transmission in order to supply lubricant, but the flow is not sufficient to create any effective driving connection.

The valve unit 37 is connected by means of a threaded stem 51 and clevis 52 to a lever arm 53, pivoted by a pin 54 to an adjustable support 55 which is threaded into the upper wall of the unit housing. The opposite end of the lever is formed with two contiguous arcuate sections 56 and 57, one of which is in engagement with a roller 58 mounted on a lever arm 59 which is pivotally mounted within the unit 34. The adjacent wall of the unit is formed with a boss 61 on which is mounted a cam 62 whose lift surface contacts a slide 63 resiliently engaging the lever 59 through an interposed spring 64. The cam 62 is manually operable by the pilot through an associated lever 65 and suitable linkage (not shown). When the lever 65 is pulled to the left as viewed in the drawing, the lift surface of the cam 62 will compress the spring 64, thereby making movement of the lever 53 more difficult because of the force exerted by the roller 58 against the arcuate faces 56 and 57. On the other hand, when the lever 65 is swung to the dotted line position, the slide 63 may move outwardly thereby reducing the resistance.

The unit 34 also contains a sealed bellows 67 which is evacuated to place it under a sub-atmospheric pressure and which contains a spring 68 urging the bellows to an extended position. The upper end of the bellows 67 is also connected to the lever arm 53 through a stem and clevis connection 69. The vent 70 communicating with the atmosphere permits barometric pressure to be exerted at all times on the bellows 67 in opposition to the urge of the spring 68. It will thus be seen that an adjustment may be made between the springs 64 and 68 so that the spring 68, for any given setting of the lever 65, will snap the lever arm 53 to the upper or dotted line position when a predetermined altitude is reached.

Since such movement will change the flow of pressure oil from the inlet duct 38 and line 45 to the line 44, it will thus be seen that the transition from low to high speed ratio may be effected under adjustable automatic control.

Figure 3:
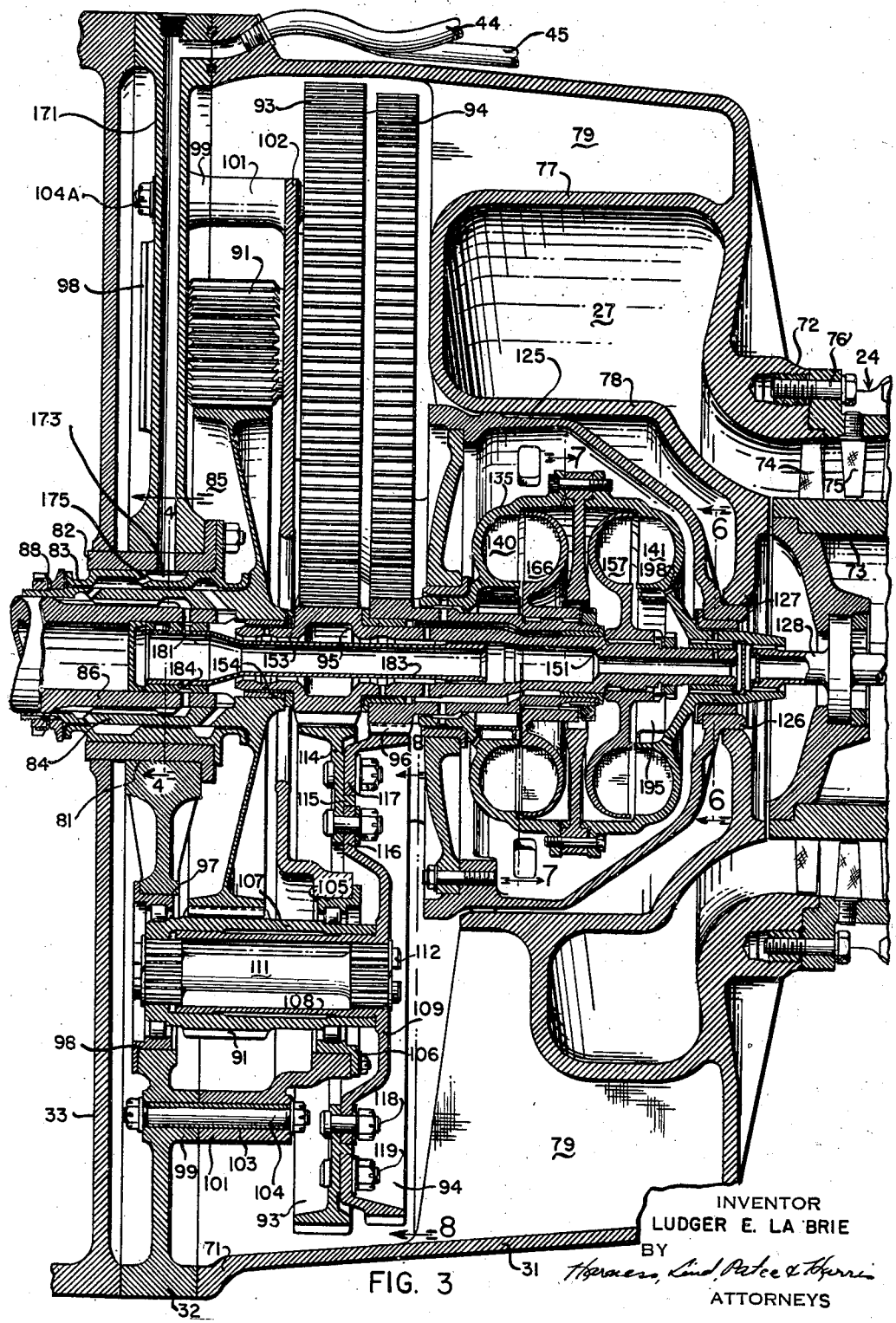
Fig. 3 is a longitudinal section of the transmission looking down from the top of the device as shown in Fig. 1.

Referring now to Fig. 3, there is illustrated at the left the end plate 33 of the engine block, the housing 31 and the end plate 32 heretofore referred to, as well as the oil supply pipes 44 and 45. The end plate 32 is substantially circular and is made to abut the wall 33 being secured thereto by suitable bolts (not shown). The housing 31 is generally of a dome shape with a circular pad 71 at the end thereof to abut against the end plate 32. The opposite or smaller end of the housing 31 is formed with a shouldered pad 72 receiving the end of the supercharger rotor and stator assembly, designated by the numeral 24 in Fig. 1. It may be noted in passing that this supercharger assembly includes a rotary hub 73 carrying a plurality of rotor blades 74, one stage of which may project within the outline of the housing 31. The assembly 24 moreover carries inter-spaced stator plates 75, so that, as the rotor hub 37 is turned over, air will be inducted through the scoop 26 for compression and delivery past the last stage of blades 74. Bolts 76 secure the supercharger 24 to the end wall 72 of the housing 31, and it will be apparent that upon removal of these bolts, the supercharger assembly may be withdrawn intact. The scroll 27, which receives the supercharger delivery for transmission to the manifold 28, is, however, formed within the confines of the housing 31. This construction involves the inclusion of internally formed walls 77 and 78 which are supported within the housing 31 by a series of webs 79. The clear space defined by the internal trace of the wall 78 is utilized to support one of the sub-assemblies of the transmission (particularly the hydraulic coupling) as will hereinafter be more fully pointed out.

The end plate 32 is formed with a central aperture 81 in line with the axis of the rotor 73 of the supercharger 24. This aperture is fitted with a liner 82 and a bearing 83 provided with recessed portions and oil ports which will be referred to in detail hereinafter, in connection with a discussion of the oil admission system. The bearing 83 rotatably receives a hub 84 of a main driving or step-up gear 85. The hub 84 is internally splined to receive the splined end 86 of a work shaft, in this case the driving shaft leading from the engine 20. Referring in this connection to Figures 4 and 5, it will be noted that some of the splines on the shaft 86 are cut away, as indicated by the reference numeral 87. These cut-away portions provide ducts for flow of hydraulic fluid, and this feature will also be referred to at a later and more appropriate point. The drive shaft 86 is fitted within the splines of the hub 84 by endwise movement, so that the entire transmission unit may be readily withdrawn from the crankcase wall 33. The hub 84 is rotatably secured within the bearing 83 by a suitable lock nut and end thrust washer assembly 88.

The gear 85 transmits power to a pair of diametrically opposed complementary gears 91 constantly meshing with the gear 85 and also rotatably mounted on the end plate 32. The gears 91 in turn are rotatably connected to a pair of stepped transmission gears 93 and 94 respectively. The gears 93 and 94 are in mesh with coupling pinions 95 and 96 respectively, which pinions are also rotatably mounted in alignment with the rotor 73 and the drive shaft 86. The gears 95 and 96, however, are not mounted on the end plate 32.

The end plate 32 is provided with diametrically opposed apertures 97, in each of which is fitted a bearing race 98 for partially supporting the gear sets 91, 93 and 94. The plate 32 is also provided, in the same line, with bosses 99 which align with lugs 101 on a carrier plate 102, overlying the gear 85. The bosses 99 and lugs 101 are centrally reamed to receive hollow dowels 103 which effect accurate alignment of the plate 102 with respect to the plate 32. These dowels in turn receive through bolts 104 and suitable securing nuts 104A. When the bolts are pulled up there is no danger of misalignment, as might be the case if the dowels were not employed.

The plate 102 is formed with apertures 105 receiving bearing races 106 in line with the races 97. The inner race for these bearings is made a part of the hub 107 for the gear 91. This hub is hollow, and it telescopically receives another hollow hub 108 which is integral with a web 109 for the transmission gears 93 and 94. Each hub 107 and 108 is formed at one end portion with internal splines which mate with complementary splines formed at the ends of a coupling rod 111. This rod is secured against axial displacement by nuts 112, and, through the end splined connections to the two hubs causes the web 109 to rotate in unison with the gear 91.

The gears 93 and 94 may be generated from ring blanks, the ring 114 for the gear 93 being formed with an annular shoulder 115, adapted to lap the periphery 116 of the web 109. The blank for the gear 94 may be formed with an offset internal ring 117 adapted to fit snugly around the opposite surface of the shoulder 115. Thus, the two gear rings are both mounted on a common web, but are offset from each other so as to provide the necessary clearance, and to enable these gears to operate in the usual manner of stepped gears. Since the gears 93 and 94 run in unison, and in constant mesh with the pinions 95 and 96, it is desirable to provide some effective means for indexing these gears at the time the transmission is put together. Referring concurrently to Figures 3 and 8, it will be noted that both gear rings are secured to the web 109 by means of radially spaced bolts 118 and 119. The holes for these bolts are circumferentially slotted as indicated by the reference numeral 121 in Fig. 8. When the ring gears are assembled on the web, either or both rings may be rotated so that the teeth are properly indexed and aligned for running engagement with the teeth of the pinions 95 and 96, thereby to eliminate binding and clashing. Proper adjustment will moreover, assure the division of the load substantially equally between each pair of gears 93 and 94, thereby eliminating excessive bending stress on the bearings and the quill shaft 111.

From the foregoing description it will be seen that the end plate 32 carries with it, as a sub-assembly, all of the transmission gearing necessary to transmit power from the work shaft 86 to the hydraulic coupling unit of the mechanism, thus, when the transmission is removed from the engine, the end plate 32 may be withdrawn by endwise movement, to carry with it the gears 91, 93 and 94, together with the countershaft construction mounted between the bearing apertures 97 and 105. It will also be noted that the transmission gear 93 is of greater diameter than the gear 94, the pinion 95 being of course, of smaller diameter than the pinion 96. The gear 94 may, therefore, readily clear the teeth of the pinion 95 during assembly or disassembly.

The hydraulic coupling sub-assembly comprises a casing or sub-housing 125 which is mounted within the recess defined by the internal wall 78. This housing is formed with an apertured shoulder 126 mounted in an aperture 127 centrally formed in the end portion of the wall 78, and therefore in alignment with the shaft 86 and another work shaft, or driven shaft, 128 which is directly connected to the supercharger rotor 73. The coupling housing 125 is also formed with a pair of spaced outstanding lugs 129, best shown in Figures 1 and 9. These meet the internal wall of the main housing 31 at a point obscured by the gears 93 and 94, as shown in Fig. 3. Therefore, these lugs do not appear in this last mentioned figure. However, it will be apparent that the purpose of the lugs 129 is to support the sub-housing 125 within the main housing 31, and, at the same time, avoid interference with the compact gear train carried by the end plate 32.

The housing 125 has one open end in which is mounted an end plate 131 formed with a centrally located aperture 132 in line with the aperture 126. These apertures respectively receive bearing bushings 133 and 134 for supporting the elements of the hydraulic coupling.

The coupling comprises a runner element 135 formed with spaced hubs 136 and 137 respectively mounted in the bearings 133 and 134. The runner 135 is also provided with spaced radial portions 138 and 139 each of which receives a series of buckets or turbine blades 140 and 141 respectively. These radial portions merge into upstanding peripheral portions 142 and 143 which abut the common spacer plate 144 provided with a web 145 extending inwardly toward the coupling axis. The two sections of the runner structure and the plate 144 are formed with aligned axially disposed bolt holes to receive cap screws 146, some of which are entered from the right, and others of which are entered from the left, thereby the better to secure the runner assembly against the forces encountered in its high velocity rotation.

The hub section 137 of the runner assembly extends beyond the housing 125, and it is internally splined to receive the splines 147 on the driven shaft 128. It will, therefore, be observed that the supercharger may be firmly coupled to the transmission by endwise movement, and that such connection may be readily broken when it is desired to disassemble the power plant.

Power is transmitted to the shaft 128 in a high-speed ratio from the driving shaft 86 through a sleeved jack shaft 151 which extends from the pinion 95 through the housing 125 and is rotatably mounted within the runner hub 137 by a bushing 152. The opposite end of the sleeve 151 is formed with a trunnion 153 rotatably supported within the hub 84 of the gear 85 by a bushing 154 (see Figures 3 and 4). Within the sub-housing 125, the sleeve 151 is fitted, by means of a splined connection, with an impeller 156 formed with vanes 157 which are operatively positioned with respect to the blades 141. This mounting is effected by means of a shouldered portion on the sleeve 151 and a lock nut assembly 158. Rotation of the pinion 95, through its engagement with the gear 93, therefore causes rotation of the impeller 157, and the transmission of power through the buckets 141 whenever hydraulic fluid is supplied. A second sleeve 161, forming an extension of the hub portion of the pinion 96, is telescopically mounted around and in spaced relation to the sleeve 151 by means of combined radial and thrust bushings 163 and 164.

The sleeve 161 receives an impeller formed with a hub 165, which is splined and secured to the sleeve, and which is contiguous with a vane portion 166 operatively disposed with respect to the buckets 140. Upon rotation of the gear 96, the impeller vanes 166 will, therefore, transmit power to the runner assembly 135, and thence to the driven shaft 128, whenever hydraulic fluid is supplied to this pair of coupling elements. Due to the speed differential occasioned by the relative diameters of the pinions 95 and 96, it will be noted that the impeller 166 revolves at a lower speed than the impeller 157. There is, therefore, a speed differential between the sleeves 151 and 161, which is taken care of by the bearing surfaces provided in the bushings 163 and 164. Depending upon the amount of working fluid supplied to the coupling members, the driven shaft 128 will, therefore, be rotated at a relatively low speed when power transmission takes place through the buckets 140, and at a higher speed ratio when transmission occurs through the buckets 141.

Working fluid is selectively supplied to the coupling pairs 166—140 or 157—141 by hydraulic fluid entering the transmission assembly through the pipes 44 and 45. Referring to Figures 3, 4 and 5, it will be seen that the end plate 32 is provided with two cored radial ducts 171 and 172 which lead to aligned apertures formed in the liner 82 positioned in the aperture 81. As previously noted, the high speed connection is taken through the pipe 44 and therefore the duct 171, while the low speed connection is taken through the duct 172 from the pipe 45. The bearing 83, positioned in the liner 82, is formed with two diametrically opposed circumferentially extending slots 173 and 174, respectively communicating with the ducts 171 and 172. One wall of the groove 173 is formed with a series of piercing apertures 175 communicating with an internal groove 176 formed on the inner surface of the bearing 83. The groove 176 in turn is lined up with holes 177 formed in the hub 84, and in communication with the splined section of the hub and shaft 86 through a relief portion 178. Oil may therefore flow through the bearing and hub and through the ducts formed by the removed splines 87, into another internal circumferential groove 179 and thence through apertures 181 formed in the end of the shaft 86.

Figure 9:
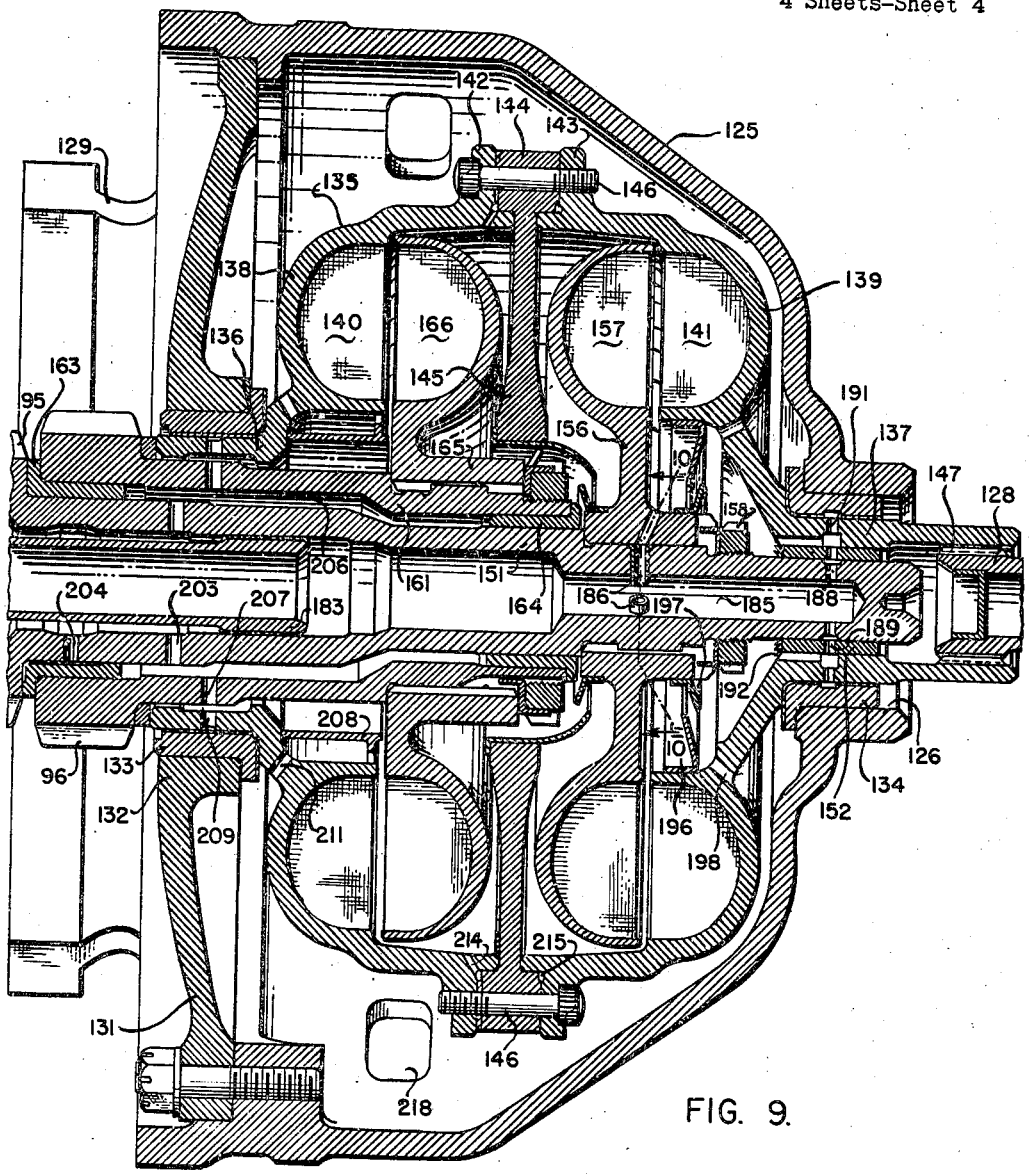
Fig. 9 is an enlarged section showing a hydraulic coupling member substantially identical with that illustrated in Fig. 3, but modified therefrom to show a specifically different form of oil directing means.
Figure 10:
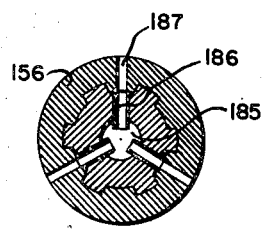
Fig. 10 is a section on the line 10—10 of Fig. 9.

The interior of the shaft 86 and the sleeve 151 receive a telescoping tube 183 having enlarged ends which fit snugly against the bores of the shaft and sleeve, but provided with a reduced central section to provide clearance and a fluid passage for a substantial portion of the length of the sleeve 151. Oil passing through the port 181 flows inside of the conduit 183 by means of aligned apertures 184 and thence internally of the conduit 183 to the right hand end of the sleeve 151. The distribution of the oil passing through the conduit 183 and sleeve 151 to the hydraulic coupling element pairs may then be effected in any one of several ways. One form is shown in Fig. 3, while a specifically different form is shown in Fig. 9. In Fig. 9, the oil enters a blocked end portion 185 provided, as shown in Fig. 10, with three radially extending ducts 186 projecting inwardly from the internal wall of the section 185, and aligned with ports 187 in the hub portion 156 of the impeller member 157. Due to the projection of the ducts 186, the oil must reach a certain depth in the bore 185, before it can enter the region between the coupling elements 157 and 141. At the same time, some of the oil will flow to the extreme end of the bore 185, and thence, through aligned radial holes 188, 189 and 191, to the bearings 134 and 152. The oil so delivered to the bearings, of course, acts as a lubricant and coolant, and it then flows back into the coupling pairs through axially extending ducts 192.

In Fig. 3, the tube type of duct structure 186 is not employed, but all of the oil flows in through the bearing structure as best illustrated in Fig. 6. Otherwise these bearing constructions are substantially identical. In Fig. 3, the working fluid, after performing its lubrication function, is directed to the space between the impeller 157 and the turbine 141 by means of a baffle 195. In Fig. 9, two baffles are employed, a baffle part 196 being connected to the member 141, and a complementary baffle 197 being connected to the impeller 157. The runner 141 in each case is provided with an escape port 198 for the relief of liquid not diverted by the baffle arrangement, and it is returned to the oil pumping system in a manner hereinafter explained.

In order to trace the flow of oil to the low speed coupling pair 166—140, reference may again be made to the duct 172 which supplies the hydraulic fluid to the circumferential groove 174. Oil entering this groove flows through suitable holes to an internal groove 201 spaced from the groove 176 and from the collector groove 179 by an internal portion of the bearing 84 in contact with the end of the shaft 86. The groove 201 communicates with ports 202 formed in the hub 82, and which in turn lead to the space between the conduit 183 and the inner wall of the sleeve 151. Oil entering this space lubricates the bushing 163 through suitable holes 204, and then flows through ports 203 formed in the inner sleeve 151, to a space 206 between the inner sleeve and the outer sleeve 161. Here the oil finds a duct 207 in registry with the hub portion 136 of the runner 140, and it may flow axially of the impeller underneath a baffle 208 to the space between the impeller 166 and the runner section 140. The duct 207 also supplies oil to a hole 209 for the lubrication of the bearing 133. Any oil not directed to the coupling pair is removed from the rotating system through one or more ports 211 for drainage into the housing 125.

It will accordingly be seen that, depending upon the position of the control valve 37, the hydraulic fluid is admitted to one or the other of the pairs of coupling elements, lubricating and cooling the bearings during its passage from the pipe 44 or 45 to the related coupling portion. It will also be recalled that the control valve assembly 34 was provided with means to by-pass a limited amount of oil into the blocked hydraulic line. Thus, the oil will flow freely to either the coupling pair 166—140 or 157—141, depending upon which line is open, but a small amount of oil will nevertheless flow to the other pair, thereby to assure proper lubrication and cooling.

The oil will, of course, leak into the sub-housing 125 through the holes 198 and 211, and it will also escape between the coupling pairs and be thrown by centrifugal force against the inner surface of the runner section 135. Accordingly, the portions 135 and 139 are each formed with apertures 214 and 215 which communicate with tangential slots 216 formed in the end faces of the central portion 144. All of the oil collecting within the housing 125 is drained to the bottom of the main housing 31 through openings 218 formed in the casing 125. This oil may be returned to the crankcase or other source through any suitable return line and pumping system, not necessary here to be illustrated or further described.

It is believed that the purposes and mode of operation of the several parts has been made clear as the detailed description has progressed, and therefore only a brief summary is indicated. The power shaft 86 causes rotation of the gear 85, and thereby concurrent rotation of the meshing gears 91 and attached spur gears 93 and 94. These in turn, by their meshing engagement with the pinions 95 and 96, drive the two impellers 157 and 166 at all times. The control mechanism supplies working fluid to one or the other of the impellers and its associated turbine, in such quantity as to cause the runner assembly 135 to revolve, and with it the driven shaft 128. At the same time, an amount of oil, insufficient to effect any coupling action, is admitted to the other pair for cooling and bearing lubrication purposes. When the valve 37 is reversed, the coupling pair theretofore in service will drain while the coupling not previously in service is filled. There will be a small time interval during the draining of the one and the filling of the other when transmission will be effected at some intermediate speed value, thus enabling the mechanism to change the speed ratio in a smooth manner. Any speed differential between the impellers 157 and 166, or any change in speed of the runner assembly 135, is of course, taken care of by the several bearings which permit relative rotation at whatever differentials are imposed by the existing working conditions.

It will also be recalled that the entire transmission can be assembled and shipped and installed as a self-contained unit and it will be seen from the foregoing description that the gearing can be handled as a sub-unit, while the coupling assembly itself within the housing 125 also constitutes a self-contained sub-assembly or unit.

Although the invention has been described with respect to two embodiments only, it is not intended to limit the invention specifically to the illustrated forms, but rather to encompass within its scope of all those modifications and variations within the purview of the following claims.

I claim:

1. A variable speed transmission comprising a housing including transmission gearing and a hydraulic coupling, said housing being formed with aligned openings at opposite ends thereof, a concentric axially extending wall formed within the casing around one of said openings, a hydraulic coupling casing mounted within said wall, said casing being formed with a driven shaft connection concentrically positioned in said one opening, said casing being further provided with means for supporting a pair of rotatable telescoping sleeves, said sleeves projecting from the casing at the opposite end thereof and toward the other opening of the housing, pinions of different size mounted on said sleeves, the larger of the pinions being located adjacent the casing, a detachable end plate for the other opening of the housing, said plate being formed with an opening adapted to receive a drive shaft, gearing including countershaft gears mounted on said end plate and extending into the housing therefrom, said countershaft gears comprising gears meshing with said pinions, and adapted, upon assembly or disassembly, to move longitudinally thereof, and means for securing the end plate to the housing, whereby upon assembly or disassembly, the end plate and transmission gears may be removed as one unit, and the hydraulic coupling and pinions may be removed as another unit from the housing.

2. In a variable speed transmission, a main housing having an open end and an end plate to cover said end, said housing and plate being formed with apertures adapted to receive driving and driven shafts, a supporting wall within the housing, a sub-housing mounted on the supporting wall, a self-contained hydraulic coupling in the sub-housing and having an element entering the aperture of the main housing for axially detachable driving connection with one of said shafts, a bearing mounted in the aperture of said end plate, a gear mounted in said bearing, a second bearing supported on said plate on the inner face thereof, additional gears drivingly connected to said first named gear mounted on said second bearing, a hollow driving sleeve extending from the sub-housing toward said additional gears, pinion means on the sleeve for axially detachable driving connection with said additional gears, whereby the end plate and gears carried thereby may be readily removed as a unit from the housing and sub-housing, and duct means formed in the end plate and communicating with the hollow sleeve to provide a fluid connection from the exterior of the housing to the hydraulic coupling.

3. In a transmission, a main dome-shaped housing having an open end and a centrally positioned aperture formed at its opposite end, an internal concentric wall formed in the housing contiguous with said apertured end and extending axially toward said open end, a concentric pad formed on the exterior of the housing at the apertured end thereof, whereby said housing may be brought into abutting relationship with a mechanism to be geared through the transmission, a hydraulic coupling mounted within the space defined by said internal concentric wall, said coupling including a rotative element aligned with said aperture and having a splined portion for engagement with a complementary portion of said mechanism adapted to abut said pad, the open end of the housing being formed with a concentric pad, an end plate for said open end formed with a centrally disposed aperture, a splined element mounted in the aperture and being adapted to engage a complementary portion of another mechanism geared through the transmission to the first mechanism, gears mounted on the inner face of the end plate in driving relationship with said last named splined element, said gears including members meshing with a second element of said coupling when the plate and coupling are assembled in the main housing, and fluid duct means extending through said plate into said coupling to supply working fluid thereto.

4. In a transmission including a main housing having a coupling positioned therein and carrying axially located driving pinions, an end plate for the housing and having a centrally located bearing aperture, a transmission gear having a hub journalled in said aperture, a second bearing aperture formed in said plate and radially positioned outwardly from the central aperture, a bracket member mounted on said plate and formed with a bearing axially aligned with said second bearing aperture, a hub journalled in said second bearing aperture and said last named bearing, a gear carried by the last named hub meshing with said transmission gear, and stepped gears carried by said hub and meshing with the driving pinions.

5. In a transmission having a main housing containing a coupling member, said coupling member including driving pinions axially aligned within the housing, an end plate for the housing having a centrally positioned main shaft bearing, a transmission gear having a hub journalled in said main bearing, a countershaft radially spaced with respect to the main bearing, said countershaft carrying a pinion meshing with the transmission gear and stepped gears meshing with the driving pinions, means for rotatably supporting said countershaft comprising a bearing member in said plate, a bracket overhanging said plate and including a second bearing member for the countershaft, said bracket having a boss engaging the plate, aligned apertures formed in the plate and boss, tubular dowels positioned in said aligned apertures to center said bearings and gears, and securing bolts connecting the plate and bracket in said dowels.

6. In a transmission having a housing for a coupling including pinion elements, and an end plate, a countershaft mounted on the plate, a gear web carried by the countershaft, a pair of gear rings carried by the web and meshing with said pinion elements, said gear rings having different diameters, and rotatably adjustable connecting members securing said web and rings together for conjoint rotation, said adjustable connection permitting the indexing of the teeth of the gear rings to each other for concurrent meshing with the pinions.

7. In a hydraulic coupling, a main housing having an end plate, gearing including a transmission gear disposed on the end plate, a hydraulic coupling having a plurality of impellers and complementary turbines mounted in the housing, a pair of telescoping sleeves respectively carrying said impellers extending from the coupling for driving connection with elements of said gearing, said sleeves and transmission gear being axially aligned, a conduit extending from the hub of the transmission gear into one sleeve, ducts formed in said sleeve to convey fluid to its impeller, a fluid connection from said hub exterior of the conduit for conveying fluid to the other sleeve and its connected impeller, supply ducts on said end plate respectively communicating through said hub with the interior and exterior of said conduit, and means for supplying working fluid to said supply ducts and thereby selectively to said impellers.

8. In an assembly comprising a housing open at one end; and a coupling unit contained therein and including first and second gears, a driven part, and means for selectively clutching the first gear or the second gear with the driven part; the combination therewith of a unit removable from the housing for providing access to the coupling unit and comprising an end member closing the open end of the housing and means for drivingly connecting a driving shaft to the coupling unit, said connecting means being mounted on the end member within the housing and comprising a third gear adapted to be mounted upon and drivingly connected to said shaft, a fourth gear meshing with the third gear, a fifth gear meshing with the first gear, a sixth gear meshing with the second gear, and means securing the fifth and sixth gears to the fourth gear in axial alignment therewith.

9. In an assembly comprising a housing open at one end, a driving part at the open end of the housing, a driven part at the other end of the housing, an end member closing the open end of the housing, a coupling unit positioned within the housing and including a first gear and a second gear larger than and farther from the open end of the housing than the first gear and means selectively drivingly associating the first gear or the second gear with the driven part, and means drivingly connecting the driving part and the coupling unit and comprising a third gear adapted to be mounted on and drivingly connected to the driving part, a fourth gear meshing with the third gear, a fifth gear meshing with the first gear, a sixth gear meshing with the second gear and being smaller than and farther away from the open end of the housing than the fifth gear, and means associating the fifth and sixth gears in driving association and axial alignment with the fourth gear; the combination with the end member and the connecting means, of means mounting the connecting means on the end member of enabling the end member and the connecting means to be removed as a unit for providing access within the housing to the coupling unit.

10. In the assembly specified in claim 9, the means mounting the connecting means on the end member including a supporting member for the fourth, fifth and sixth gears secured to and spaced from the end member within the housing and extending between the fourth and fifth gears.

11. In the assembly specified in claim 9, the means mounting the connecting means on the end member including a supporting member secured to and spaced from the end member within the housing, aligned bearings formed in the end and support members, a first hub drivingly carrying the fourth gear and journalled in the bearings, and a second hub carrying the fifth and sixth gears in driving relation and drivingly secured within the first hub.

12. In the assembly specified in claim 9, the means mounting the connecting means on the end member including a supporting member secured to and spaced from the end member within the housing, aligned bearings formed in the end and support members, a first hub journalled in the bearings and drivingly carrying the fourth gear between the end and support members, and a second hub drivingly secured within the first hub and drivingly carrying the fifth and sixth gears at an end inwardly of the support member.

13. In the assembly specified in claim 9, the fifth and sixth gears being formed as rings, the means mounting the connecting means on the end member including a supporting member secured to and spaced from the end member within the housing, aligned bearings formed in the end and support members, a first hub drivingly carrying the fourth gear and journalled in the bearings, and a second hub drivingly secured within the first hub and having a web formed integrally therewith drivingly carrying the fifth and sixth gear rings.

14. In an assembly comprising a housing open at one end, a driving part at the open end of the housing, a driven part at the other end of the housing, an end member closing the open end of the housing, a coupling unit positioned within the housing and including a casing, a first gear, a second gear larger than and farther from the open end of the housing than the first gear, both gears being exterior of the casing and nearer the open end of the housing than the casing, and means within the casing selectively drivingly associating the first gear or the second gear with the driven part, and means drivingly connecting the driving part and the coupling unit and comprising a third gear adapted to be mounted on and drivingly connected to the driving part, a fourth gear meshing with the third gear, a fifth gear meshing with the first gear, a sixth gear meshing with the second gear and being smaller than and farther away from the open end of the housing than the fifth gear, and means associating the fifth and sixth gears in driving association and axial alignment with the fourth gear; the combination with the end member and the connecting means, of means mounting the connecting means on the end member for enabling the end member and the connecting means to be removed as a unit for providing access within the housing to the coupling unit.

15. In the assembly specified in claim 14, the housing being formed with a delivery portion for a supercharger adapted to be connected to the driven part, the delivery portion having a cylindrical wall receiving the casing of the coupling unit.

16. In a hydraulic transmission, a housing having one end open and the opposite end provided with an aperture, a first drive shaft positioned in the aperture, an hydraulic coupling positioned within the hosing and having a first drive element at one end extending to the housing aperture and into driving engagement with the first shaft, said hydraulic coupling also having a second drive element at its opposite end, an end plate covering the said open end of the housing and provided with an opening, a second drive shaft positioned in the opening, gearing mounted on the inner wall of the end plate and engaging the said second drive shaft and the said second drive element of the hydraulic coupling so as to transmit drive therebetween and adapted to be disengaged from the second drive element of the hydraulic coupling upon detachment and removal of the end plate from the housing, a conduit extending from the hydraulic coupling toward the opening in the end plate in alignment with the second drive shaft, and duct means formed in said end plate and the gearing carried thereby and registering with said conduit to provide a fluid connection for the hydraulic coupling.

LUDGER E. LA BRIE.

REFERENCES CITED

The following references are of record in the file of this patent:

UNITED STATES PATENTS

| Number | Name | Date |
|---|---|---|
| 1,104,736 | Schneider | July 21, 1914 |
| 1,354,717 | Bertels | Oct. 5, 1920 |
| 1,577,004 | Turney | Dec. 23, 1922 |
| 1,678,582 | Allen | July 24, 1928 |
| 2,063,471 | Stedefeld | Dec. 8, 1936 |
| 2,091,637 | Hoffman et al. | Aug. 31, 1937 |
| 2,150,151 | Burrows | Mar. 16, 1939 |
| 2,194,949 | Lysholm | Mar. 26, 1940 |
| 2,210,855 | Halford | Aug. 6, 1940 |
| 2,306,233 | Smith | Dec. 22, 1942 |

FOREIGN PATENTS

| Number | Country | Date |
|---|---|---|
| 366,358 | Italy | Dec. 24, 1938 |
| 399,133 | Germany | July 28, 1924 |

Certificate of Correction

Patent No. 2,483,977

October 4, 1949

LUDGER E. LA BRIE

It is hereby certified that errors appear in the printed specification of the above numbered patent requiring correction as follows:

Column 1, line 41, strike out the word "and"; column 12, line 62, for "of" read *for*; column 14, line 13, for "hosing" read *housing*;

and that the said Letters Patent should be read with these corrections therein that the same may conform to the record of the case in the Patent Office.

Signed and sealed this 31st day of January, A. D. 1950.

[SEAL]

THOMAS F. MURPHY,
*Assistant Commissioner of Patents.*